INVENTORS
WILMER C. ANDERSON
JOHN H. FIRESTONE
by: Louis Altman
ATTY.

INVENTORS
WILMER C. ANDERSON
JOHN H. FIRESTONE
by: Louis Altman
ATTY.

INVENTORS
WILMER C. ANDERSON
JOHN H. FIRESTONE
by: Louis Altman
ATTY.

REMOTE CONTROL SYSTEM INCLUDING CIRCUITRY FOR SUPERIMPOSING CONTROL SIGNALS ON SELECTED HALF CYCLES OF A SUPPLY LINE CARRIER WAVE

Filed Aug. 31, 1964

INVENTORS
WILMER C. ANDERSON
JOHN H. FIRESTONE by: Louis Altman
ATTY.

United States Patent Office 3,451,052
Patented June 17, 1969

3,451,052
REMOTE CONTROL SYSTEM INCLUDING CIRCUITRY FOR SUPERIMPOSING CONTROL SIGNALS ON SELECTED HALF CYCLES OF A SUPPLY LINE CARRIER WAVE

Wilmer C. Anderson, Greenwich, and John H. Firestone, Stamford, Conn., assignors to General Time Corporation, New York, N.Y., a corporation of Delaware Filed Aug. 31, 1964, Ser. No. 393,131
Int. Cl. H04m *11/04;* G05b *19/00*
U.S. Cl. 340—310 6 Claims

ABSTRACT OF THE DISCLOSURE

A remote control system associated with an A-C supply line wherein control signals are selectively superimposed on respective opposite polarity half cycles of an A-C power line voltage wave which functions as a carrier wave. The control signals are produced by a magnetic oscillator powered by the A-C supply line voltage carrier for producing an alternating output having a frequency dependent upon the amplitude of the input voltage applied thereto. Different amplitude input voltages are applied to the oscillator to produce alternating outputs having different frequencies. Amplitude-modulated alternating signals produced in response to the oscillator outputs are superimposed on the A-C supply line carrier at selected times determined by selector switches. The control signals are utilized to actuate a plurality of separate remotely located receiver means each of which includes a tuned circuit having a resonant frequency corresponding to a pre-selected one of the different oscillator output frequencies so as to respond to a preselected one of the control signals to control different desired operations.

This invention realtes to a remote control system; more specifically, to a central program device which turns on and off various electrical appliances at remote locations without the necessity for any specific electrical interconnection between the central program device and the remote appliances other than the fact that they are both connected to a common power supply line.

An object of the invention is to provide a new and improved remote control system, particularly one which includes circuitry for superimposing control signals on a supply line carrier wave.

Another object is to provide a system of this type wherein the control signals are selectively superimposed on respective opposite polarity half cycles of an A-C power line voltage wave which functions as a carrier wave. More specifically, an object is to provide such a system wherein signals superimposed during one polarity half cycle of the carrier wave may be used to turn an appliance on and signals superimposed during the opposite polarity half cycle may be used to turn the same appliance off. Another object is to provide means for responding to such signals in order to turn the appliance on and off as required.

Another object of the invention is to provide new and improved circuitry for superimposing control signals on a supply line carrier wave. Still another object is to provide means for superimposing such signals at predetermined times.

Still another object of this invention is to provide a remote control system, as set forth hereinabove, having a plurality of channels, each channel having the capability of controlling a different electrical appliance remotely. In relation to this feature, subsidiary objects of the invention include the provision of a remote control system in which each control channel is represented by a different frequency signal which is superimposed by amplitude modulation upon a supply line carrier wave. Another subsidiary object of the invention is to provide a plurality of receiving devices, each of which is responsive to a different frequency control signal superimposed on the carrier wave. Another object is to provide receiving devices of this type which are adjustable for tuning to different control signal frequencies so that a given receiver can be used on any desired channel. A related object is to provide remote control circuitry for superimposing desired frequency control signals on the carrier wave at specific preselected times of the day.

Other objects and advantages of the invention will become apparent upon reading the following detailed description and upon reference to the drawings, in which.

Figure 1:
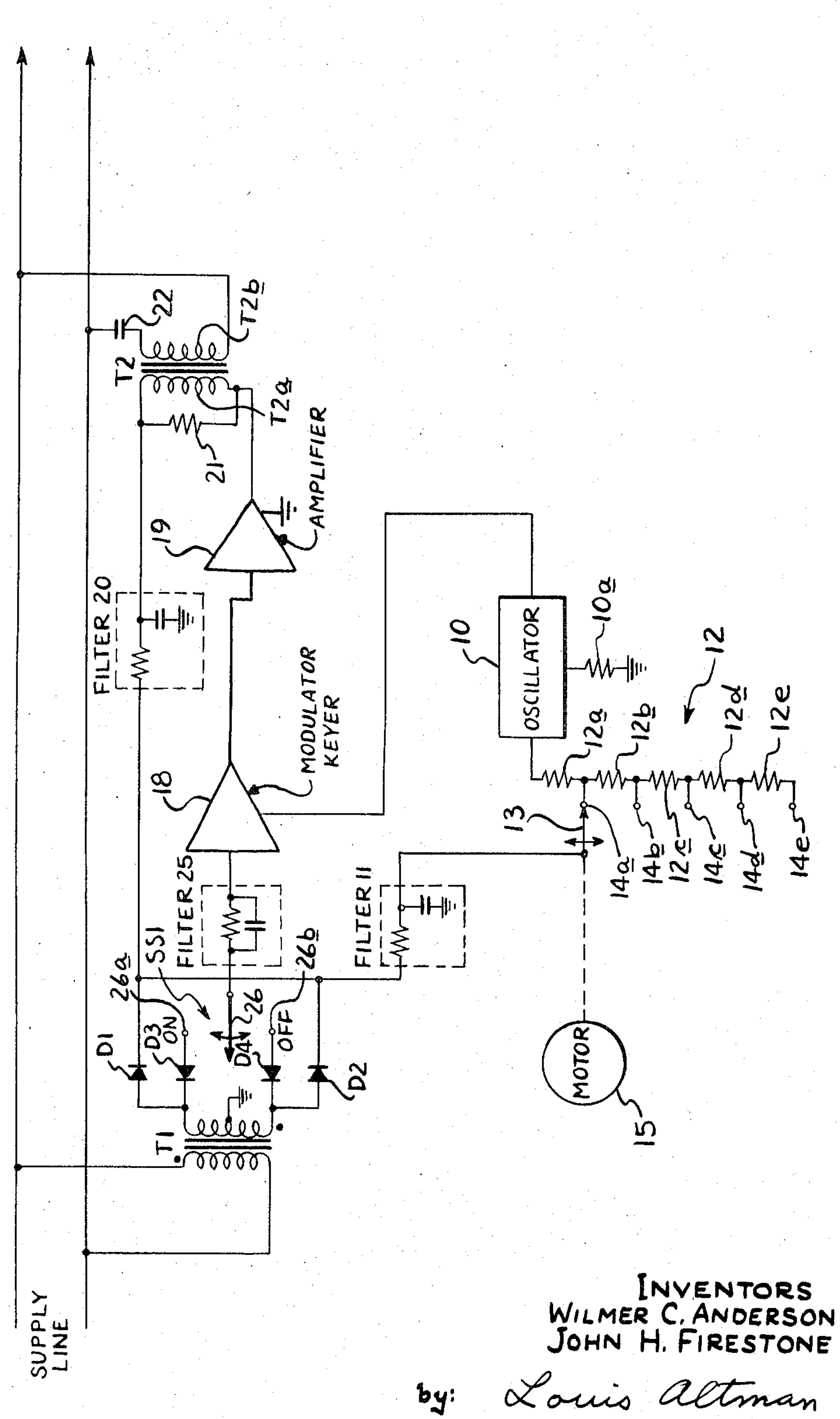
FIGURE 1 is a block diagram of transmitter circuitry for superimposing control signals on a supply line carrier wave.
Figure 2:
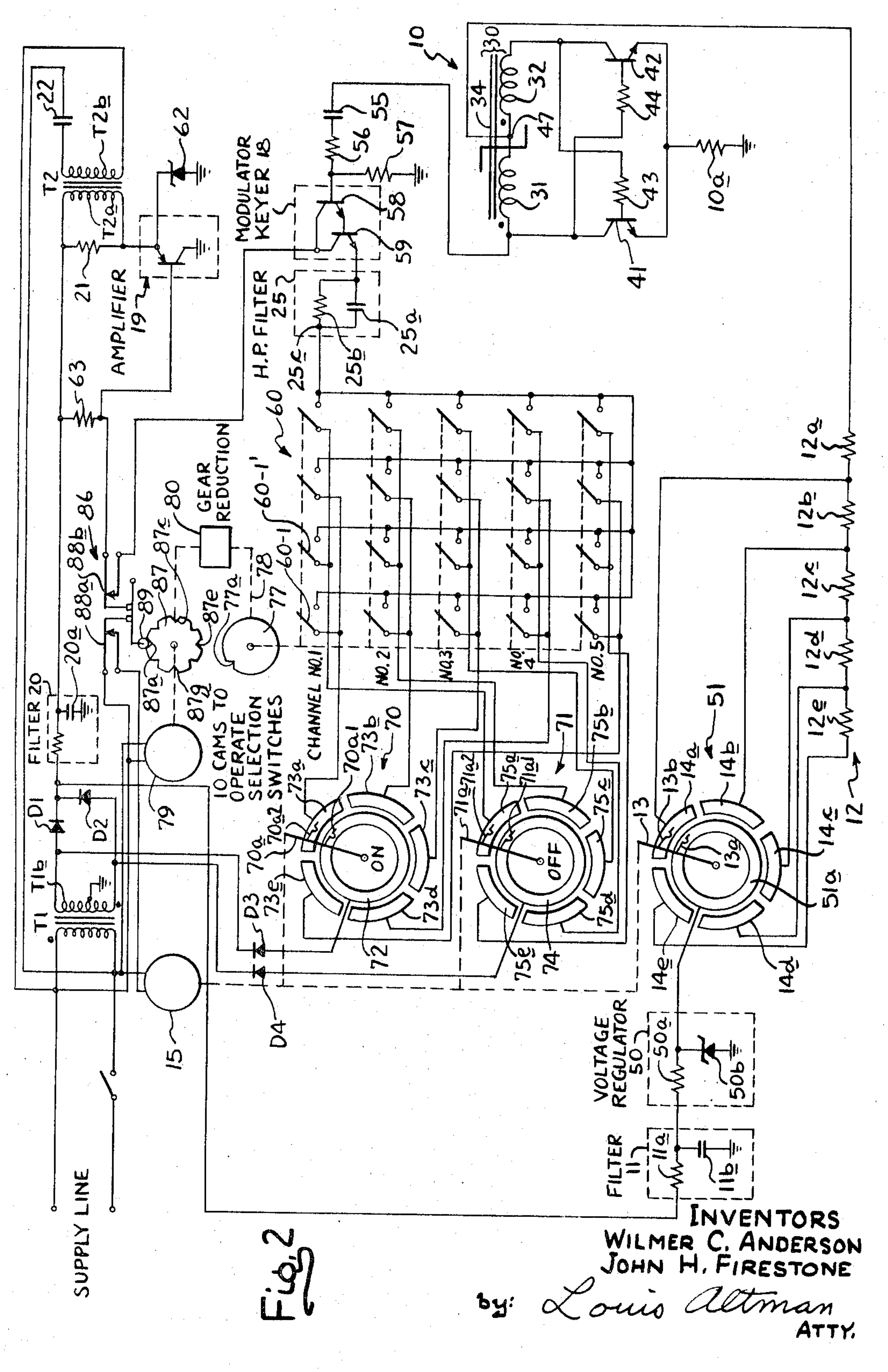
FIG. 2 is a schematic diagram of the circuit shown in FIG. 1.
Figure 3A:
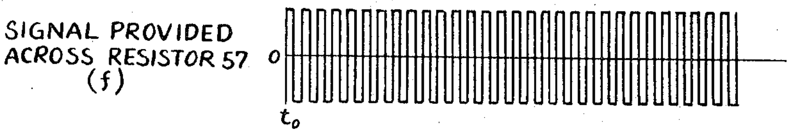
Figure 3B:
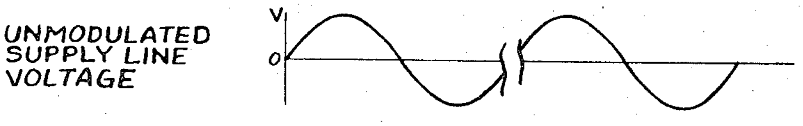
Figure 3C:
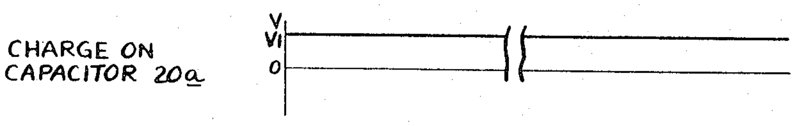
Figure 3D:
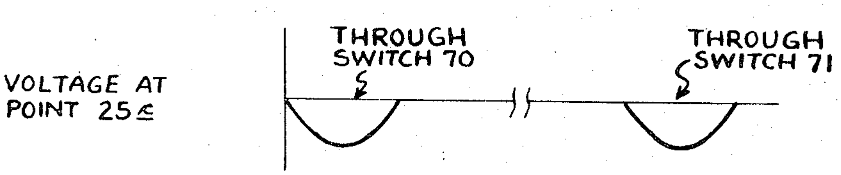
Figure 3E:
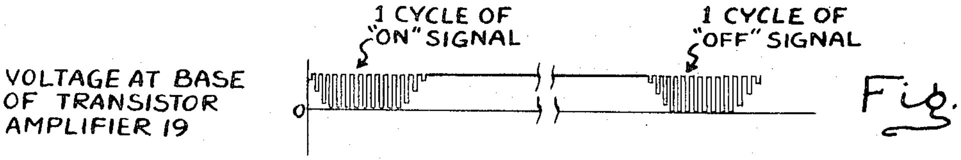
Figure 3F:
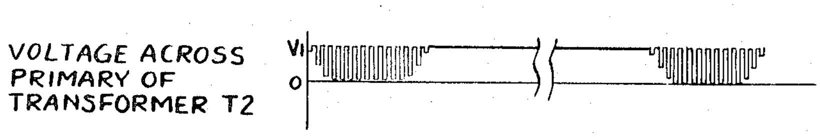
Figure 3G:
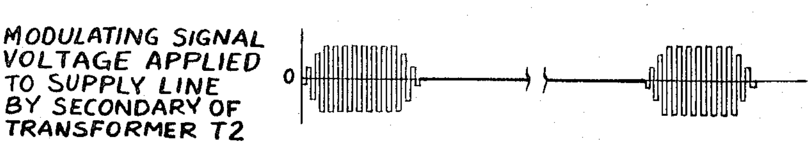
Figure 3H:
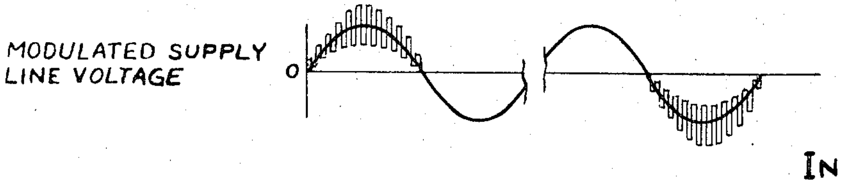
Figure 4:
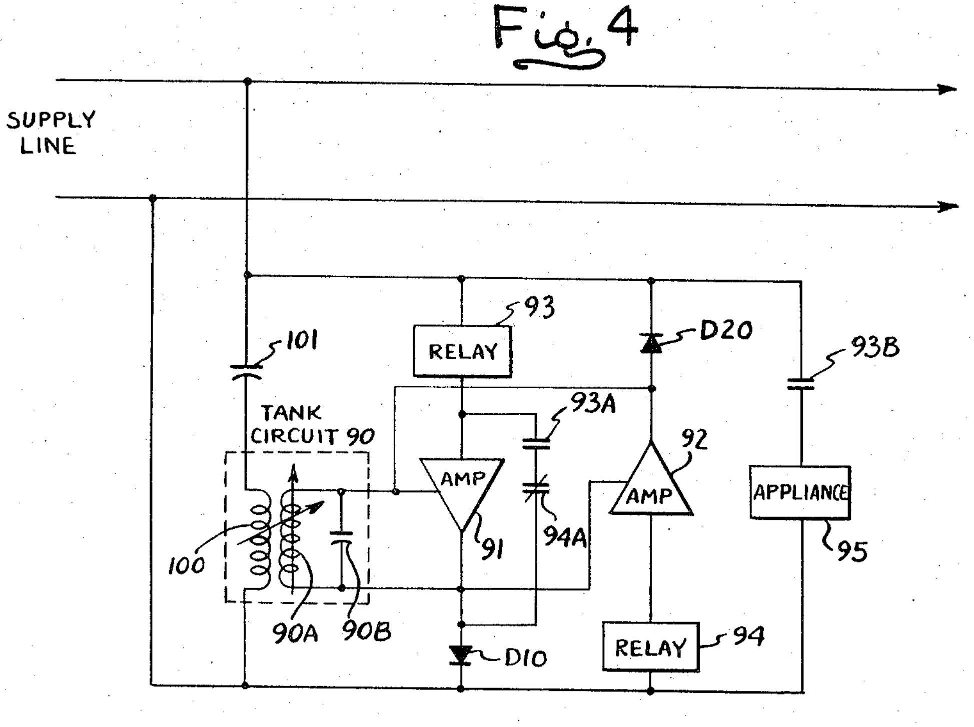
Figure 5:
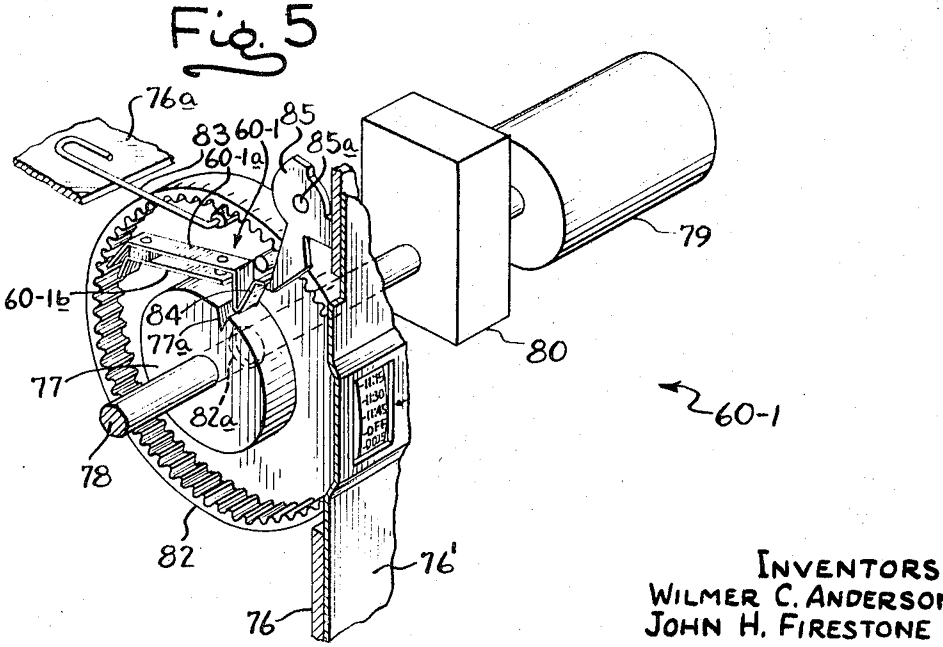

FIGS. 3*a* through 3*h* is a series of waveform diagrams showing the signals produced at selected points in FIGS. 1 and 2;

FIG. 4 is a diagram of receiver circuitry for responding to control signals superimposed on a supply line carrier wave to control a desired operation; and FIG. 5 is a perspective view of a selector switch arrangement which may be used in the circuit shown in FIG. 2.

In accordance with one aspect of the present invention, means are provided for superimposing control signals on a supply line carrier wave. More specifically, a transmitting device is provided for superimposing control signals having different frequencies on a supply line carrier wave at preselected times. Referring to FIG. 1, a circuit is illustrated for superimposing control signals on a supply line carrier wave by amplitude-modulation. In the exemplary arrangement, the supply line carrier wave is disclosed as an alternating voltage wave, for example, the 60 cycle per second A-C supply line voltage wave commonly found in residences.

For the purpose of providing an alternating output which controls the production of control signals, an oscillator 10 has been provided. As may be seen, the oscillator 10 is powered by the A-C supply line wave through a transformer T1, a full-wave rectifier consisting of diodes D1 and D2, a filter network 11 and a resistance network 12. With the exemplary system, the oscillator 10 is assumed to be of the type which produces an output signal having a frequency dependent upon the amplitude of the input voltage applied thereto. In order that the oscillator output frequency may be varied whereby control signals having different frequencies may be produced, the resistance network 12 includes a plurality of resistance segments 12*a*–12*e* and is connected to the filter 11 through a movable wiper arm 13 which engages contact terminals 14*a*-14*e* associated with selected junctions of the resistance segments so that the effective resistance of the resistance of the resistance network 12 is dependent upon which contact terminal is engaged by the wiper arm 13. The wiper arm 13 is driven by a motor 15 which operates, for example, at a speed of one revolution per minute so that succeeding ones of the contacts 14*a*-14*e* are engaged by the wiper arm for prescribed time intervals during each revolution of the motor. A resistor 10*a* is also associated with the oscillator 10 and, as will become apparent, the resistance network 12 and the resistor 10*a* together function as a voltage-dividing network so that the amplitude of the oscillator input voltage is dependent upon the effective resistance of the resistance network 12. Since the effective resistance is dependent upon which of the contact terminals 14*a*-14*e* is engaged by the wiper arm 13, it follows that a plurality of different frequency output signals equal in number to the contact terminals 14*a*-14*e* are produced by the oscillator during each revolution of the motor 15.

The output signals produced by the oscillator 10 are transmitted to a control input of a modulator keyer or gating network 18 so that, when the keyer has been conditioned for operation, the keyer is alternately rendered operative and nonoperative at a frequency rate corresponding to the oscillator output signal frequency. In turn, the keyer 18 controls the operation of an amplifier 19 which, as will become apparent, controls the superimposing of control signals on the supply line carrier. For the purpose of conditioning the modulator keyer 18 for operation, a conditioning switch SS1 is provided. When the contact arm 26 of the switch SS1 is moved into engagement with terminal 26*a*, the output of the modulator keyer 18 is connected to the supply line through a filter network 25, a diode D3 and the transformer T1 so that the modulator keyer 18 is conditioned for operation when the supply line voltage is positive, i.e., during the positive half cycle of the A-C supply voltage. Conversely, when the contact arm 26 is moved into engagement with the terminal 26*b*, the output of the modulator keyer 18 is connected to the supply line through the filter 25, a diode D4 and the transformer T1 so that the modulator keyer is conditioned for operation when the supply line voltage is negative, i.e., during negative half cycles of the A-C supply voltage.

The supply line is connected to the input of the amplifier 19 through the transformer T1, the full-wave rectifier consisting of diodes D1 and D2, a filter network 20 and the parallel arrangement of a resistor 21 and the primary winding T2*a* of a control-signal-superimposing transformer T2. The secondary winding T2*b* of the transformer T2 is connected across the supply line through a capacitor 22 so that signals induced therein in response to the production of signals in the primary of transformer T2 are superimposed on the supply line voltage, the signals induced in the secondary of the transformer T2 constituting the desired control signals. Since the input of the amplifier 19 is connected to the output of the modulator keyer 18, the operation of the amplifier and thus the production of a signal in the primary winding of transformer T2 are controlled by the keyer. When the contact arm 26 of switch SS1 is in engagement with terminal 26*a*, the keyer 18 is rapidly "keyed" on and off during each positive half cycle of the A-C supply voltage so that alternating signals are produced in the primary winding T2*a* of transformer T2 having frequencies determined by the oscillator output signal frequency and corresponding alternating control signals are induced in the transformer secondary winding T2*b* which are superimposed upon the positive half cycles of the A-C supply voltage. Conversely, when the contact arm 26 is in engagement with terminal 26*b*, the keyer is rapidly "keyed" on and off during each negative half cycle of the A-C supply voltage so that alternating signals are produced in the primary winding T2*a* having frequencies determined by the oscillator output signal frequency and corresponding alternating control signals are induced in the secondary winding T2*b* which are superimposed upon the negative half cycles of the A-C supply voltage.

In view of the foregoing, it follows that, if the contact arm 26 of the switch SS1 is selectively moved into engagement with the contacts 26*a* and 26*b* at desired times, control signals having different frequencies, each representing a control signal for a different "channel," may be selectively superimposed on the positive and negative half cycles of the A-C supply voltage. Additionally, as will become readily apparent, the control signals superimposed on the A-C supply wave carrier with the exemplary circuit are amplitude-modulated alternating signals having frequencies substantially higher than the A-C supply wave carrier frequency.

Referring to FIG. 2, a schematic diagram of a transmitting circuit corresponding to that shown in block form in FIG. 1 is illustrated. As may be seen, the oscillator 10 is illustrated as a magnetic oscillator including a saturable transformer 30 having a pair of main windings 31 and 32 wound about a core 34. The core is formed of a readily saturable magnetic material having a generally rectangular hysteresis loop, such material being commercially sold, for example, by G. L. Electronics Company under the name "Orthonik" type P 1040. For driving the core into its opposite conditions of saturation, which may for convenience be termed "positive" and "negative" saturation, the windings 31 and 32 are energized by transistors 41 and 42 having base or control circuits which are alternately energized by feedback or "cross" connections including resistors 43 and 44. Since the transistors 41 and 42 are illustrated as being of the NPN type, the oscillator 10 will respond to the application of a positive potential supply signal to an input terminal 47 provided between the transformer main windings 31 and 32. In order to complete the oscillator circuit, the emitters of the transistors are connected to ground through the resistor 10*a*.

As previously mentioned in connection with FIG. 1, power is supplied to the oscillator 10 from the supply line through the transformer T1, the full-wave rectifier consisting of diodes D1 and D2, the filter network 11, the movable wiper arm 13 and the resistance network 12 consisting of resistors 12*a*–12*e*. Additionally, a voltage regulator 50 is interposed between the filter 11 and the contact arm 13, and the contact arm 13 forms part of a rotary contact member 51. The diodes D1 and D2 are so connected to the secondary winding T1*b* of the transformer T1 that a full-wave rectified, positive alternating signal is applied to the filter 11. The filter 11 includes a resistor 11*a* and a capacitor 11*b* and is provided for the purpose of smoothing out the ripple in the full-wave rectified voltage so that a substantially constant D.C. supply voltage is provided at the filter output. The voltage regulator 50 includes a resistor 50*a* and a Zener diode 50*b* and is provided for regulating the level of the D.C. supply voltage, the level being held constant at the Zener diode breakdown voltage.

The resistance network 12 and the resistor 10*a*, as previously set forth, function together as a voltage-dividing network. Accordingly, the amplitude of the positive supply voltage applied to input terminal 47 of the oscillator is dependent upon the effective resistance of the resistance network 12. For the purpose of regulating the effective resistance of the resistance network, the rotary contact member 51 has been provided. The rotary contact member 51 has a centrally located inner ring contact portion 51*a* which is connected to the output of the voltage regulator 50 and also has a plurality of outwardly located arcuate contact terminals corresponding to the contact terminals 14*a*–14*e* in FIG. 1. The wiper arm 13 has a pair of wipers 13*a* and 13*b* which, at any given time, respectively engage the inner ring contact 51*a* and one of the outer arcuate contact terminals 14*a*–14*e*. The wiper arm 13 is, as previously mentioned, driven by a motor 15 which operates, for example, at a speed of one r.p.m. so that succeeding ones of the contact terminals 14*a*–14*e* are engaged during prescribed time intervals of each motor revolution. As a result, different numbers of the resistance segments 12*a*–12*e* are interposed between the oscillator input terminal 47 and the output of the voltage regulator 50 during each time interval, i.e., the effective resistance of the resistance network 12 is different during each time interval. Due to the voltage-dividing effect of the resistance network 12 and the resistor 10*a*, a different positive supply voltage is applied to the magnetic oscillator 10 during each time interval when one of the contacts 14*a*–14*e* is engaged by the wiper 13*b*.

In operation of the oscillator 10, application of the supply voltage causes both of the transistors 41 and 42 to tend to conduct, but because of a slight inherent unbalance in the circuit, one transistor will normally tend to conduct more heavily than the other. Conduction in the predominating transistor induces a voltage in the associated transformer winding which is in such a direction as to forward bias the transistor so that the predominating transistor tends to conduct more heavily. In response to conduction of the predominating transistor, the potential at the collector thereof drops and, since the base of the other transistor is connected thereto through the "cross" connection, the other transistor is rendered nonconductive. When saturation of the core is reached, the rate of change of flux decreases, hence, by transformer action, the induced forward biasing voltage decreases and the current in the conducting transistor decreases so that the potential at the collector rises. The rising collector potential turns on the former nonconducting transistor and conduction in this transistor induces a voltage in the associated transformer winding which is in such a direction as to forward bias this transistor so that this transistor tends to conduct more heavily. Conduction in the second transistor causes the potential at the collector thereof to drop so that the former conducting transistor is rendered nonconductive. The current flowing in the second transistor now drives the core to the opposite condition of saturation. This cycle is repeated at a rate which is directly proportional to the applied voltage and inversely proportional to the saturation flux and the number of turns in the transformer winding.

In the exemplary arrangement, the output of the oscillator 10 is taken off the collector of transistor 41, and output voltage pulses are produced by the oscillator as the core switches from one condition of saturation to the other condition of saturation and back again in response to the alternate conduction of transistors 41 and 42. With the exemplary oscillator, the output produced thereby will be in the form of a square-wave signal, negative-going pulses being produced when the transistor 41 is rendered conductive and positive-going pulses being produced when the transistor 41 is rendered nonconductive. Due to the presence of the resistor 10*a*, the output produced by the oscillator 10 will always be positive, i.e., the output will vary about a positive reference level as positive-going and negative-going pulses are produced and the output will still be positive when negative-going pulses are produced.

As previously set forth, the output signal produced by the oscillator 10 is transmitted to the control input of the modulator keyer 18 for the purpose of controlling the operation thereof. For the purpose of modifying the oscillator output signal so that the signal transmitted to the modulator keyer varies about a substantially zero reference level, a network including a capacitor 55 and resistors 56 and 57 is interposed between the oscillator output and the modulator keyer input. During operation of the oscillator when an output signal is being produced thereby, capacitor 55 couples the output signal to the resistors 56 and 57 which function as a voltage divider. As a result, a signal is provided across the resistor 57, which signal constitutes the control input signal for the modulator keyer 18. Accordingly, a square-wave alternating input signal having positive and negative pulses, such as that shown in FIG. 3, is applied to the base of a transistor 58 in the modulator keyer 18, the particular frequency of the input signal being determined by the particular effective resistance of the resistance network 12 and thus being determined by the position of the contact arm 13 of the rotary contact member 51.

In its exemplary form, the modulator keyer 18 includes the transistor 58 and a second transistor 59, both being of the NPN type. The collectors of the transistors 58 and 59 are connected together, the base of transistor 58 is connected to the upper terminal of resistor 57 so that the operation thereof is controlled by the voltage signal provided across resistor 57 and the emitter of transistor 58 is connected to the base of transistor 59 so that operation of transistor 59 is controlled by operation of transistor 58. Additionally, the emitter of transistor 59 is connected to the secondary winding T1*b* of transformer T1 through the filter 25, a bank of selector switches 60, either of two switches 70 and 71 and diodes D3 and D4. As will be readily apparent, the bank of selector switches and the switches 70 and 71, when combined, take the place of the single selector switch SS1 in FIG. 1. When one of the selector switches in the bank 60 and either switch 70 or 71 are closed, a circuit is completed from the emitter of transistor 59 through the filter 25 and one of the diodes D3 and D4 to the secondary winding T1*b* of transformer T1. The collector of transistor 59 is also connected to the secondary winding T1*b* through a contact 88*b*, the resistor 63, the filter 20 and one of the diodes D1 and D2 so that a circuit is completed therebetween when contact 88*b* is closed. Consequently, the modulator keyer 18 is conditioned for operation by the oscillator 10 when (1) a switch in the switch bank is closed, (2) contact 88*b* is closed and (3) the switch 70 is closed concurrently with a positive half cycle of the A-C supply or the switch 71 is closed concurrently with a negative half cycle of the A-C supply.

In the disclosed arrangement, the amplifier 19 takes the form of a PNP power type transistor having its emitter connected to the parallel arrangement of the resistor 21 and the primary winding T2*a* of the transformer T2. The collector of this transistor is connected to ground and its base is connected through contact 88*b* to the collectors of transistors 58 and 59. Additionally, a Zener diode 62 is connected between the emitter and collector of the transistor 19 to limit the voltage provided across the emitter-collected circuit whereby the transistor is protected against overloading, for example, to protect the transistor 19 against voltage spikes induced when the A-C supply voltage is first supplied to the transmitting circuit, and to damp out transients. Further, a resistor 63 is connected in parallel with the series circuit of (1) the parallel arrangement of resistor 21 and the primary winding T2*a* and (2) the emitter-base circuit of the amplifier 19. As previously mentioned, the supply voltage is applied to the amplifier 19 through the transformer T1, the full-wave rectifier network consisting of diodes D1, D2, the filter 20 and the parallel arrangement of the resistor 21 and the transformer primary T2*a*. Accordingly, a positive full-wave rectified pulsating voltage is applied to the filter 20 which smooths out the pulsations so that a substantially ripple-free D.C. voltage (see FIG. 2) is provided thereby. The level of the filtered voltage provided by the circuit 20 is determined by the charge on a capacitor 20*a* in the filter and corresponds to the average level of the full-wave rectified pulsating voltage. Due to the base voltage transmitted from filter 20 through the resistor 63, the transistor amplifier 19 will not conduct if either contact 88*b* is open or circuit 18 is not being "keyed."

As set forth above, the base of the amplifier transistor 19 is connected to the collectors of transistors 58 and 59 in the modulator keyer 18 so that the operation of the transistor 19 is controlled by the operation of the transistors 58 and 59. The alternating square-wave signal provided across the resistor 57 by the oscillator 10 causes the transistor 58 to be alternately rendered conductive and nonconductive so that the transistor 59 is likewise alternately rendered conductive and nonconductive during the selected polarity half cycles of the A-C supply voltage as determined by the closing of one of the selector switches in the bank 60 and by closure of either the switch 70 or the switch 71.

A brief description of the operations of the keyer 18 and the amplifier 19 may be helpful in providing a better understanding of the present invention and, for this purpose, reference will be made to FIG. 3. It should be noted that in FIG. 3, two cycles of A-C supply voltage are shown. The first cycle illustrates the transmission of an "on" signal, which occurs during the positive half of such a cycle when the switch 70 is closed. The second cycle illustrates the transmission of an "off" signal, which occurs during the negative half of such a cycle when the switch 71 is closed. These two illustrative cycles are split apart to indicate that they do not necessarily represent consecutive cycles of the A-C supply voltage, but rather represent cycles occurring at preselected times.

If the transistor 59 is rendered conductive at the beginning of either polarity half cycle of the A-C supply voltage, current flows from the filter 20 through resistor 63, contact **88*b*, the collector-emitter circuits of transistors 58 and 59, the filter 25, the switch bank 60, either switch 70 or switch 71** and diode D3 or D4 to the transformer secondary winding T1*b*. The wave form at terminal **25*c* of filter 25 consists of negative half cycle excursions of the 60 cycle supply voltage. When the connection is made through the "off" switch 71** and the diode D4 to the dot-marked side of the balanced secondary T1*b*, this is merely the negative half cycle of the 60 cycle A-C voltage applied directly to the filter 25. Conversely, whenever the connection is made through the "on" switch 70 and the diode D3 to the unmarked side of balanced secondary T1*b*, the wave form is the same negative excursion as seen in FIG. 3, but in this case it coincides with the positive half cycles of the A-C supply line voltage applied to the primary of transformer T1. In either case, the voltage appearing at terminal **25*c* is negative half-wave rectified 60 cycle which continues as long as the circuit is completed through the selector switch bank 60 and either the "on" switch 70 or the "off" switch 71**.

When the contact **88*b* is closed, the base drive for the amplifier 19 is derived from the collector terminal of the modulator keyer circuit 18. The modulator keyer 18 modulates the negative half cycle appearing at terminal 25*c* in accordance with the base drive output of the oscillator 10 applied to the base of transistor 58. Accordingly, a square-wave modulated signal having an envelope corresponding to the negative excursion at terminal 25*c* is produced at the collector terminal. However, the filter 25, which is a high pass filter, attenuates the 60 cycles envelope without attenuating the high frequency square-wave modulation. The resulting wave form applied to the base of the amplifier 19** is shown in FIG. 3.

As previously noted, amplifier 19 is normally biased to cut off through resistor 63. However, the base drive mentioned above alternately turns the amplifier 19 on and off in accordance with the high frequency square-wave modulation. Consequently, the amplifier 19 is turned on and off at a frequency equal to the output frequency of the oscillator 10. As a result, amplifier 19 energizes the primary of transformer T2 with a wave form as shown in FIG. 3. This gated square-wave voltage appearing across the transformer primary is inductively coupled to the secondary T2*b*. The output voltage developed in the transformer secondary is then coupled through capacitor 22 to be impressed on the A.C. supply line, see FIG. 3.

The circuit is designed in such a way that there is a minimal coupling of the 60 cycle power supply voltage through the transformer T2 into the circuit of the amplifier 19, where it might otherwise cause damage, yet a relatively efficient coupling of the modulating signal takes place from the amplifier 19 through the transformer T2 into the power circuit. This is accomplished by an appropriate selection of the impedances of the secondary T2*b* and capacitor 22. The capacitor is selected to have a relatively low impedance at the signal frequencies generated by oscillator 10. As a result, the signal frequency voltage is coupled relatively efficiently through the capacitor 22 to be superimposed on the power lines. However, the impedance of capacitor 22 at 60 cycles is much higher and, more specifically, is much higher than the impedance of the secondary T2*b*. As a result, most of the 60 cycle voltage appearing across the supply lines is dropped across the capacitor 22 and relatively little of it is dropped across the transformer secondary T2*b*. Since little of the 60 cycle voltage appears across the transformer secondary T2*b*, correspondingly little of it is inductively coupled into the circuit of the amplifier 19. In order to assure that the impedance of the transformer secondary T2*b* is lower than the 60 cycle impedance of capacitor 22, certain design considerations are important. To begin with, the amplifier 19 is selected to be of the emitter-follower type since this configuration is characterized by a relatively low output impedance. With this low impedance present in the primary circuit of the transformer T2, the impedance reflected by the primary into the secondary circuit is kept correspondingly low. Secondly, the transformer T2 is selected to have a step down ratio going from the primary to the secondary. As a result, the impedance reflected into the secondary circuit is further minimized. As a result, the total effective impedance of the secondary T2*b* is kept low so that it is exceeded by the 60 cycle impedance of the capacitor 22.

As additional features of interest, it should be noted that transformer T2 is selected to have a low remanence core so as to introduce minimal distortion into the high frequency modulating signal. Further, the resistor 21 is connected across the primary T2*a* as a damping resistor to absorb inductive kickback spikes generated when the voltage applied by amplifier 19 to the transformer primary is keyed on and off.

The bank of selector switches 60 has been provided for causing control signals having different frequencies to be superimposed upon selected polarity half cycles of the A-C supply voltage at preselected times. The bank 60 includes five horizontal rows of selector switches, each horizontal row representing one channel. Each such row or channel includes two "on" switches 60 (i.e. the first and third switches from the left) and two "off" switches (the second and fourth). The contact arms of the "on" switches 60 are connected to the secondary winding T1*b* of the transformer T1 through the "on" switch 70, disclosed as a rotary contact member, and the diode D3. Those of the "off" switches 60 are connected through the "off" switch 71, also disclosed as a rotary contact member, and the diode D4. The "on" and "off" rotary contact members 70 and 71 are identical to the rotary contact member 51 associated with the resistance network 12. Accordingly, the "on" contact member 70 has a wiper arm **70*a*, an inner ring contact portion 72 and a plurality of outer arcuate contact terminals 73*a*–73*e* and the wiper arm 70*a* has a pair of wipers 70*a*1 and 70*a*2 for engaging the contact portions. Likewise, the "off" contact member 71 has a wiper arm 71*a*, an inner ring contact portion 74 and a plurality of outer arcuate contact terminals 75*a*–75*e* and the wiper arm 71*a* has a pair of wipers 71*a*1 and 71*a*2 for engaging the contact portions. The contact terminals 73*a*–73*e* are independently connected to the "on" switches in different ones of the five rows or channels and likewise the contact terminals 72*a*–75*e* are independently connected to the "off" switches in different rows or channels. As may be seen, the contact portion 72** of the "on" contact member is connected to the secondary transformer winding T1*b* through the diode D3 to the unmarked side of secondary T1*b* so that this contact member is rendered effective during positive half cycles of the A-C supply carrier wave. On the other hand, the contact portion 74 of the "off" contact member is connected to the secondary transformer winding T1*b* through the diode D4 to the dot-marked side of secondary T1*b* so that this contact member is effective during negative half cycles of the A-C supply carrier wave. In the exemplary arrangement contact arms **70*a* and 71*a* are ganged together with contact arm 13 so that all three contact arms are rotated together by the motor 15. As a result, the contact arms of the "on" and "off" switches of each channel or row are electrically connected to the secondary of the transformer T1 during different portions of each revolution of the motor 15 when a different input voltage is applied to the oscillator 10 and thus a different frequency output is produced thereby. Consequently, if switches in different channels are closed at different preselected times, different frequency control signals will be superimposed on the positive and negative half cycles of the A-C supply voltage. For example, if the first "on" switch in channel No. 1 (designated as 60–1) is closed at a preselected time, a control signal will be superimposed upon positive half cycles of the A-C supply voltage when wiper 70*a*2 engages contact terminal 73***a*. Since wiper 13*b* engages terminal 14*a* at this time, the output frequency of the oscillator 10 and thus the frequency of the superimposed control signal will be determined by the voltage-dividing effect of resistors 12*a* and 10*a*.

The selector switches in the bank 60 may, for example, be constructed in accordance with the teachings of the co-pending application Ser. No. 443,491 filed on Mar. 29, 1965 which has a common assignee. Briefly speaking, the selector switches are cam operated and are constructed so that they may be preset to be closed at any selected time during a twenty-four hour period.

For a more detailed description of an exemplary selector switch 60–1, reference is made to FIG. 5. As may be seen, the exemplary selector switch is in the form of a rotary cam-type switch and is associated with a main housing or panel 76. The switch includes a cylindrical cam member 77 which has a V notch or detent 77*a* formed therein and which is mounted on a shaft 78 for rotation therewith. The shaft 78 is driven by a motor 79 through a gear arrangement 80. Since, as set forth above, the selector switches are to be closed at preselected times during a twenty-four hour period, it will be assumed that the motor 79 is operating at one half revolution per hour and that the gear arrangement 80 has a 12:1 ratio whereby the shaft 78 and the cam member 77 make one revolution per each twenty-four hours.

A contact assembly 60–1 is provided for the purpose of producing an automatic switching operation and, as may be seen, includes a pair of spring-biased contact members 60–1*a* and 60–1*b* which may be respectively connected to the "on" rotary contact member 70 and the filter 25. The contact assembly is secured to a cup-like wheel 82 for rotational movement therewith and the wheel has a centrally located circular aperture 82*a* for receiving the shaft 78, the aperture 82*a* having a larger diameter than the shaft 78 so that the wheel 82 may be rotated relative to the shaft and thus relative to the cam member 77. A detent spring 83 is provided for engaging detents in the inner surface of the cup-like wheel 82 so that the wheel 82 may be located in a desired position, the detent spring 83 being secured to a plate 76*a* forming a part of the main housing or panel 76. As will be apparent, the detents engaged by the spring 83 may be so positioned around the inner surface of wheel 82 that the selector switch may be preset to operate at a desired time during a twenty-four hour period, for example, at any selected quarter hour.

For the purpose of causing the contact members 60–1*a* and 60–1*b* to be moved into and out of engagement with one another, a V-shaped cam follower 84 is formed integrally with the upper contact member 60–1*a*, the contact assembly being so mounted on the wheel 82 that the outer surface of the cam member 77 is engaged by the cam follower 84. When the cam follower 84 is in engagement with the nondetented portion of the cam follower, the contact members 60–1*a* and 60–1*b* are maintained in their open or non-engaging positions. Conversely, when the detent 77*a* of the cam member is adjacent the cam follower 84, the cam follower is driven into the detent by the inherent spring-biasing force of the contact member 60–1*a* so that the contact members are moved into engagement and the switch is closed.

In view of the foregoing, it follows that, if the cup-like wheel 82 is rotated until the contact assembly is in a desired relative position in respect of the cam member 77, the switch will be closed when the detent 77*a* reaches a desired angular position during each revolution of the cam member 77, each angular position corresponding to a prescribed time during each twenty-four hour period. Thus, the switch may be preset to be closed at a precise, preselected position or time during each revolution of the cam member.

For the purpose of locking the contact members 60–1*a* and 60–1*b* in the open or nonengaged position, a latching member 85 is provided which is pivotable about a shaft 85*a*. When sufficient clockwise rotational movement is imparted to the wheel 82, a lip of the latching member 85 engages under a lip of the cam follower 84 and prevents the cam follower from subsequently moving into the detent 77*a* when the detent is thereadjacent. Counterclockwise movement of the wheel 82 releases the members 84 and 85 from engagement.

While only a single selector switch is shown in FIG. 5, it will be understood that a plurality of such switches may be mounted on a common shaft or on commonly driven shafts. These additional switches would correspond to the others in the bank 60, such as switch 60–1′, etc. The construction of FIG. 5 permits each switch in the bank 60 to be set to close at its own selected time, independently of the others. Switch 60–1 and all other switches in the first vertical column at the left in bank 60 are connected to the switch 70, so as to cooperate in the transmission of "on" signals, i.e., signals superimposed on positive half cycles of the 60 cycle power voltage. But each of the five switches in this vertical column is connected to a different one of five contact segments 73*a*–73*e* in the switch 70, representing five different signal channels. Each channel is capable of controlling one or more appliances. Switch 60–1′ and all other switches in the second vertical column at the left in bank 60 are connected to the switch 71, so as to send "off" signals, i.e., signals superimposed on negative half cycles of the 60 cycle power voltage. Again, each horizontal row is connected to a different contact segment 75*a*–75*e* representing a different signal channel. The third vertical column from the left in the additional bank 60 is connected to provide an additional "on" column, and the fourth one is connected to provide an additional "off" column, each one again including connections for the five different signal channels. By including two sets of "on" and "off" switches in the bank 60, the system is given the capability of turning each appliance on and off two different times in each day. Thus, each of the switches in bank 60 may be preset independently to be closed at a desired relative position during each revolution of the shaft or shafts, i.e., at a desired time during each twenty-four hour period, whereby the signal superimposing circuitry is rendered effective. Accordingly, amplitude-modulated sgnals may be produced and superimposed upon the A-C supply line to turn appliances on and off at one or more preselected times during a twenty-four hour period as determined by the closing of the selector switches in the bank 60.

For the purpose of rendering the transmitting network operative for a one-minute time interval every fifteen minutes, i.e., at the beginning of each quarter hour, a control switch network 86 (FIG. 2) is provided. The control switch arrangement 86 includes a rotary contact member 87 which controls the opening and closing of contacts 88*a* and 88*b*. The rotary member 87 is driven by the motor 79 and has eight slots or indents 87*a*–87*h* equally spaced around the circumference thereof which cooperate with a cam member 89 to cause the contacts 88*a* and 88*b* to be closed only when the cam member 89 is adjacent one of the slots 87*a*–87*h*. Since the rotary member 87 is driven by the motor 79 which operates at a speed of one half revolution per hour, the contacts 88*a* and 88*b* are closed once every fifteen minutes for a prescribed time period, e.g., a one-minute time period. As previously set forth, the base of the transistor amplifier 19 is connected to the collectors of transistors 58 and 59 in the modulator keyer 18 through contact 88*b* so that the operation of the amplifier 19 is controlled by the modulator keyer 18 only when contact 88*b* is closed, i.e., once every fifteen minutes. Additionally, when contact 88b is open, a positive cut-off bias is applied to the base of the amplifier transistor 19 via resistor 63 so that the transistor is nonconductive and does not consume power during this time interval. The driving power for the motor 15 is applied thereto through contact 88a so that the motor 15 is rendered operative to drive the contact arms of switches 70, 71 and 51 through a revolution only when contact 88a is closed, i.e., once every fifteen minutes. Thus, it will be apparent that the transmitting network shown in FIG. 2 is rendered able to superimpose an amplitude-modulated control signal on the A-C supply line during a selected time interval every fifteen minutes, e.g., for one minute at the beginning of each quarter hour.

The switch wiper arms 70a, 71a and 13 scan across all five of their respective associated contact segments, representing the five signal channels, each time that the motor 15 is energized. These wiper arms are synchronized in the following manner. Assume that at a given instant, arm 13 of switch 51 selects its associated first channel contact segment 14a, thus selecting the particular connection to voltage divider 12 which causes the oscillator 10 to operate at the frequency assigned to the first channel. At the same time, the arm 71a of the "off" switch 71 selects its associated first channel contact segment 75a. Then, if any of the switches 60 located at the intersection of the first horizontal row (representing the first channel) and either the second or fourth vertical column (the "off" columns) are set to close during this particular quarter hour, and "off" signal is transmitted at the first channel frequency. Also at the same time, the arm 70a of the "on" switch 70 selects its associated first channel contact segment 73a. Then, if any of the switches 60 located at the intersection of the first channel row and either one of the "on" columns (the first or third column) are set to close at this particular time of day, an "on" signal is transmitted at the first channel frequency. The same is true for the other four channels as each of the switches moves in synchronism to scan their four remaining contact segments in succession.

In keeping with the present invention, means are provided for detecting the presence of control signals having a prescribed frequency superimposed upon a supply line signal and for controlling a desired operation in response to the detection thereof. More specifically, a receiving network is provided for rendering a desired device, such as a home appliance, operative in response to the detection of a prescribed frequency control signal superimposed upon first polarity half cycles of an A-C supply signal and for rendering the device inoperative in response to the detection of a prescribed frequency control signal superimposed upon second polarity half cycles of the A-C signal.

Referring to FIG. 4, an exemplary receiving network is illustrated which includes a tuned tank circuit 90. The tank circuit is electrically associated with the supply line, which is assumed to be a 60 cycle A-C supply line, and is tuned to a desired resonant frequency for detecting the presence of a prescribed frequency control signal superimposed upon the 60 cycle A-C supply voltage. The tank circuit 90 controls the operation of an "on" amplifier 91 when a prescribed frequency control signal is superimposed upon a positive half cycle of the A-C supply voltage and controls the operation of an "off" amplifier 92 when a prescribed frequency control signal is superimposed upon a negative half cycle of the A-C supply voltage. The amplifiers 91 and 92 in turn control the energization of relays 93 and 94. When the "on" amplifier 91 is rendered operative, unidirectional current flows therethrough and through the relay 93 causing the relay 93 to be energized so that associated contacts 93a and 93b are closed. In response to the contact 93a being closed, the relay 93 is locked in around the amplifier 91 so that the relay remains energized until a normally closed contact 94a of the relay 94 is opened. When the contact 93b is closed, a desired device 95, such as a home appliance, is "turned on."

Subsequently, when the amplifier 92 is rendered operative, unidirectional current flows therethrough and through the relay 94 causing the relay 94 to be energized so that the associated contact 94a is opened. When the contact 94a is opened, the relay 93 is deenergized so that the contact 93b is opened and the device 95 is "turned off." Thus, the device 95 is "turned on" when a control signal having a frequency corresponding to the resonant frequency of the tank circuit 90 is superimposed upon a positive half cycle of the A-C supply voltage and is "turned off" when a control signal having a frequency corresponding to the resonant frequency is superimposed upon a negative half cycle of the A-C supply voltage.

As may be seen, the tank circuit 90 includes an inductive member 90a and a capacitive member 90b which are connected in parallel. The inductive member 90a is transformer coupled by means of a winding 100 to the A-C supply line through a capacitor 101. As is well known in the art, means may be provided for regulating the coupling between the winding 100 and the inductance member 90a ( as indicated by the arrow crossing windings 100 and 90a) and means may also be provided for regulating the resonant frequency of the tank circuit 90 (as indicated by the arrow through the inductive member 90a). The amplifier 91 may take any desired form, such as a thyratron, having its grid-cathode circuit connected across the capacitor 90b so that, when a resonant frequency control signal is superimposed upon a positive A-C half cycle, the amplifier 91 is rendered conductive to cause unidirectional current to flow through the associated relay 93. Likewise, the amplifier 92 may take any desired form, such as a thyratron, having its grid-cathode circuit connected across the capacitor 90b in reverse direction so that, when a resonant frequency control signal is superimposed upon a negative A-C half cycle, the amplifier 92 is rendered conductive to cause unidirectional current to flow through the associated relay 94. Diode D10 serves to prevent positive half cycles of A-C power line voltage impressed on the cathode of diode D10 from reaching the grid of thyratron 92. Diode D20 provides similar protection for thyratron 91.

Though only one receiving circuit has been shown for responding to a superimposed control signal, it will be apparent that a plurality of such circuits may be provided which are preset to respond to different frequency control signals, i.e., to different "channels." Thus, a plurality of devices, such as home appliances or industrial equipment, may be controlled at different times by different time settings for the various channels.

In view of the foregoing, it follows that a transmitting circuit, as shown in FIGS. 1 and 2, and a plurality of receiving circuits, as shown in FIG. 4 can be connected to the A-C supply line in a residence or the like for causing selected appliances to be turned on and turned off at several different preselected times during the day. Additionally, it will be apparent that a plurality of appliances can be associated with each receiving circuit for simultaneous operation, if so desired.

Having thus described both the circuitry and operation of each portion of this system, an overall view of its operation will now be given. This will be done by way of describing a typical cycle of operation. The operator must first connect the desired number of appliances to be operated by each receiver of the type shown in FIG. 4. There may be any number of receivers employed to respond to the signals superimposed on the power line. Even if more than five different receivers are used, the system can only deliver five different daily programs of on-off operation, one such program for each of the five channels or frequencies which the system is designed to provide. In employing more than five receivers, the operator merely sets up the system so that at least one of the channels controls a plurality of receivers. Of course it is within the skill of the art to modify the transmitting circuit of FIG. 2 to include any reasonable number of channels, and the number five has been selected merely by way of illustration.

The next step is for the operator to tune the tank circuit 90 of each receiver so that it responds to the frequency of the selected channel. The operator then decides which times of day to turn on and off the various appliances associated with each channel, and programs the selector switches 60 to bring this about.

The method of programming the selector switches is best appreciated from FIG. 5. Each of the selector switches 60 has the construction illustrated there, and all such switches may be mounted in side-by-side relationship on the same time-driven shaft 78 behind the panel 76. The cup-shaped wheel 82 of each switch 60 protrudes through an opening in the panel 76 and also through a window in an escutcheon plate 76' which covers this panel opening. The fifteen minute intervals throughout the day from 00:15 a.m. to 11:45 p.m. are marked off about the outer periphery of each wheel 82. The remaining position is an "off" position, so marked on the periphery of the wheel. This "off" position is the one in which the latch member 85 restrains the cam follower 84 to hold the switch open even though the cam notch 77*a* passes thereunder. Each mark corresponds to one of the detented positions of the wheel. An indicator arrow on the escutcheon plate 76' matches up with the selected peripheral marking, visible through the window of the escutcheon plate 76'. The wheel 82 protrudes far enough through the window so that it can be turned in the manner of a thumb wheel to alter the setting as desired. The face panel of the instrument would comprise a horizontal row of such escutcheon plate windows, enabling the operator to set each of the switches 60 individually for setting up the desired program.

A typical program as set up on the panel just described would call for sending an "on" signal over a particular channel at a certain time of the day, and an "off" signal over the same channel at a subsequent time of day. If desired, additional switches in the bank 60 could be used to send subsequently a second "on" signal and still later a second "off" signal. The times at which these signals are sent are selectable in fifteen minute increments, and are read from the peripheral markings on the wheel 82. If it is desired not to actuate a particular appliance at all, or to operate it only once, during a given day, then the appropriate switches 60 are disabled by rotating them to their "off" positions.

When thus programmed, the system operates in the following manner, described in connection with FIG. 2 Motor 79 operates continuously throughout the day, and is a synchronous motor providing a mechanical time base for the system. This motor drives the cam 87 which operates to close contacts 88*a* and 88*b*, for a period of a minute once every quarter hour. During this entire one minute interval, the closing of the contact 88*a* energizes the scanning motor 15 which then drives the commutating switches 70, 71 and 51 through at least one complete revolution. Closing of the contact 88*b* allows the modulator keyer 18 to drive the amplifier 19 at any time during this one minute interval if the modulator keyer 18 should be enabled by one of the switches 60.

If the selected program calls for one or more of the switches 60 to close during the particular quarter hour, then during the one minute operating interval which occurs in that quarter hour the operation of the system will be as follows. The frequency selecting switch 51 scans over each of the five frequencies or channels in succession, causing the oscillator 10 to drive the modulator keyer 18 at each of the five frequencies successively. Simultaneously the "on" switch 70 and the "off" switch 71 scan through the five channels, i.e., the five horizontal rows of bank 60 in succession. Until a closed switch 60 is reached, the modulator keyer remains unconnected to its power supply and does not respond to the drive which it receives from oscillator 10. But when one of the switches 70 or 71 reaches a channel, i.e., a horizontal row, which contains a switch 60 that is programmed to be closed during this fifteen minute interval, then the modulator keyer 18 is connected through the bank of switches 60 and one of the switches 70 or 71 to its power supply. This enables the modulator keyer 18 to respond to its drive from the oscillator 10 and cause amplifier 19 to impress on the power line a signal of the frequency appropriate to this particular channel.

If the particular switch 60 which closes to produce this result happens to be in the second or fourth vertical column, then the connection will be made through switch 71 and the signal will be impressed on negative half cycles of the A.C. power voltage, i.e., it will be an "off" signal. On the other hand, if the particular switch 60 happens to be in the first or third vertical column, then the connection will be made through the switch 70 and the signal will be superimposed upon the positive half cycles of the AC power supply voltage, i.e., it will be an "on" signal.

During any fifteen minute interval for which none of the switches 60 are programmed to close, the switches 70, 71 and 51 are operated, and the voltage divider 12 and oscillator 10 are energized as usual during the one minute operating interval, but the modulator keyer 18 remains disabled for the lack of a connection through the bank of switches 60. As a result, no signals are impressed on the AC power line. In between the one minute operating intervals, the contacts 88*a* and 88*b* are open to deenergize the motor 15 and disconnect the amplifier 19 from the modulator keyer 18.

Each of the receivers connected to the power line responds to the particular frequency or channel to which it is tuned. It is designed to close the contact 93*b* and turn on the appliance 95 whenever the signal received coincides with the positive half cycles of the AC power voltage, and to open the contact 93*b* to turn off the appliance 95 whenever the signal coincides with the negative half cycles of the AC power voltage. It is in this manner that the system of this invention discriminates among five different channels on the basis of frequency, and discriminates between "on" and "off" signals on the basis of phase relationship relative to a common AC power source.

We claim as our invention:

1. In a remote control system associated with a supply line, the combination which comprises, an oscillator powered by the supply line carrier for producing an alternating output, having an instantaneous frequency dependent upon the instantaneous amplitude of the input voltage applied thereto, oscillator control means associated with said oscillator and cyclically operative during succeeding selected time intervals for successively applying different amplitude input voltages to said oscillator for causing outputs having different freqeuncies to be produced by the oscillator at different selected times during each succeeding time interval, means responsive to the oscillator outputs for producing amplitude-modulated signals when rendered operative, means for superimposing the amplitude-modulated signals on the supply line carrier, a plurality of timed switching means operatively connected to said amplitude modulated signal-producing means for rendering the amplitude modulated signal-producing means operative at preselected times, each of said timed switching means being operatively connected to said oscillator control means for rendering said amplitude modulated signal-producing means operative only during the time interval when said oscillator is producing an output of preselected frequency, means operatively connected to said timed switching means and responsive to the polarity of successive half cycles of said supply line carrier for rendering said amplitude modulated signal-producing means operative only during half cycles of a preselected polarity at said preselected times determined by said timed switching means, and a plurality of separate remotely located receiver means associated with the supply line, each of said receiver means being responsive to a preselected one of the different frequency superimposed signals for controlling different desired operations, each of said receiver means being adjustable for tuning to different preselected frequencies of said superimposed signals.

2. In a remote control system associated with an A-C supply line, the combination which comprises, an oscillator powered by the A-C supply line voltage carrier for producing an alternating output having an instantaneous frequency dependent upon the instantaneous amplitude of the input voltage applied thereto, oscillator control means associated with said oscillator and cyclically operative during succeeding selected time intervals for successively applying different amplitude input voltages to said oscillator for causing alternating outputs having different frequencies to be produced by the oscillator at different selected times during each succeeding time interval, means responsive to the oscillator outputs for producing amplitude-modulated alternating signals corresponding to the oscillator outputs when rendered operative, means for superimposing the amplitude-modulated alternating signals on the A-C supply line carrier, a plurality of timed switching means operatively connected to said amplitude modulated signal-producing means for rendering the amplitude modulated signal-producing means operative at preselected times, each of said timed switching means being operatively connected to said oscillator control means for rendering said amplitude modulated signal-producing means operative only during the time interval when said oscillator is producing an output of preselected frequency, means operatively connected to said timed switching means and responsive to the polarity of successive half cycles of said supply line carrier for rendering said amplitude modulated signal-producing means operative only during half cycles of a preselected polarity at said preselected times determined by said timed switching means, and a plurality of separate remotely located receiver means each of which includes a tuned circuit having a resonant frequency corresponding to a preselected one of the different oscillator output frequencies for responding to a preselected one of the signals having different frequencies superimposed on half cycles of the A-C supply line carrier of a first polarity to render desired operations operative and for responding to a preselected one of the signals having different frequencies superimposed on half cycles of the A-C supply line carrier of a second polarity to render the desired operations inoperative.

3. In a remote control system associated with an A-C supply line, the combination which comprises a magnetic oscillator powered by the A-C supply line voltage carrier for producing an alternating output having an instantaneous frequency dependent upon the instantaneous amplitude of the input voltage applied thereto, oscillator control means associated with the supply line and the oscillator and cyclically operative during succeeding preselected time intervals for applying different amplitude input voltages to the oscillator at different times during each selected time interval for producing alternating outputs having different frequencies, means responsive to the oscillator outputs for producing amplitude-modulated alternating signals when rendered operative, means for superimposing the amplitude-modulated alternating signals on the A-C supply line carrier, a plurality of timed switching means operatively connected to said amplitude modulated signal-producing means for rendering the amplitude modulated signal-producing means operative at preselected times, each of said timed switching means being operatively connected to said oscillator control means for rendering said amplitude modulated signal-producing means operative only during the time interval when said oscillator is producing an output of preselected frequency, means operatively connected to said timed switching means and responsive to the polarity of successive half cycles of said supply line carrier for rendering said amplitude modulated signal-producing means operative only during half cycles of a preselected polarity at said preselected times determined by said timed switching means, and a plurality of separate remotely located receiver means each of which includes a tuned circuit having a resonant frequency corresponding to a preselected one of the different oscillator output frequencies for responding to a preselected one of the signals having different frequencies superimposed on half cycles of the A-C supply line carrier for controlling desired operations.

4. In a remote control system associated with an A-C supply line, the combination which comprises, a magnetic oscillator powered by the A-C supply line voltage carrier for producing an alternating output having an instantaneous frequency dependent upon the instantaneous frequency dependent upon the instantaneous amplitude of the input voltage applied thereto, oscillator control means for successively applying different amplitude input voltages to the oscillator when rendered operative, means operative at selected times for rendering the oscillator control means operative for a desired time interval so that the different input voltages are successively applied to the oscillator for producing alternating outputs having different frequencies, means responsive to the oscillator outputs for producing amplitude-modulated alternating signals when rendered operative, means for superimposing the amplitude-modulated alternating signals on the A-C supply line carrier, a plurality of timed switching means operatively connected to said amplitude modulated signal-producing means for rendering the amplitude modulated signal-producing means operative at preselected times, each of said timed switching means being operatively connected to said oscillator control means for rendering said amplitude modulated signal-producing means operative only during the time interval when said oscillator is producing an output of preselected frequency, means operatively connected to said timed switching means and responsive to the polarity of successive half cycles of said supply line carrier for rendering said amplitude modulated signal-producing means operative only during half cycles of a prescribed polarity at said preselected times determined by said timed switching means, and a plurality of separate remotely located receiver means each of which includes a tuned circuit having a resonant frequency corresponding to a preselected one of the different oscillator output frequencies for responding to a preselected one of the signals having different frequencies superimposed on half cycles of the A-C supply line carrier to control desired operations.

5. In a remote control system associated with a supply line, the combination which comprises, an oscillator powered by the supply line carrier for producing an alternating output having an instantaneous frequency dependent upon the instantaneous amplitude of the input voltage applied thereto, oscillator control means associated with said oscillator cyclically operative during succeeding selected time intervals for successively applying different amplitude input voltage to said oscillator for causing outputs having different frequencies to be produced by the oscillator at different selected times during each succeeding time interval, means responsive to the oscillator outputs for producing amplitude-modulated signals when rendered operative, means for superimposing the amplitude-modulated signals on the supply line carrier, means operative at selected times during half cycles of the supply line carrier for rendering the amplitude-modulated signal producing means operative so that amplitude modulated signals are superimposed on selected half cycles of the carrier, a plurality of timed switching means operatively connected to said amplitude modulated signal-producing means for rendering the amplitude modulated signal-producing means operative at preselected times, each of said timed switching means being operatively connected to said oscillator control means for rendering said amplitude modulated signal-producing means operative only during the time interval when said oscillator is producing an output of preselected frequency, means operatively connected to said timed switching means and responsive to the polarity of successive half cycles of said supply line carrier for rendering said amplitude modulated signal-producing means operative only during half cycles of a preselected polarity at said preselected times determined by said timed switching means, and a plurality of separate remotely located receiver means associated with the supply line, each of said receiver means including first means responsive to a preselected one of the different frequency signals superimposed on half cycles of the supply line carrier of a first polarity, and second means responsive to said preselected one of the different frequency signals superimposed on half cycles of the supply line carrier of a second polarity.

6. In a remote control system associated with a supply line, the combination which comprises, a magnetic oscillator powered by the supply line carrier for producing an alternating output having an instantaneous frequency dependent upon the instantaneous amplitude of the input voltage applied thereto, oscillator control means associated with the supply line and the oscillator and cyclically operative during succeeding preselected time intervals for applying different amplitude input voltages to the oscillator at different times during each selected time interval for producing alternating outputs having different frequencies, means responsive to the oscillator outputs for producing amplitude-modulated signals when rendered operative, means for superimposing the amplitude-modulated signals on the supply line carrier, a plurality of timed switching means operatively connected to said amplitude modulated signal-producing means for rendering the amplitude modulated signal-producing means operative at preselected times, each of said timed switching means being operatively connected to said oscillator control means for rendering said amplitude modulated signal-producing means operative only during the time interval when said oscillator is producing an output of preselected frequency, means operatively connected to said timed switching means and responsive to the polarity of successive half cycles of said supply line carrier for rendering said amplitude modulated signal-producing means operative only during half cycles of a preselected polarity at said preselected times determined by said timed switching means, and a plurality of separate remotely located receiver means associated with the supply line, each of said receiver means being responsive to a preselected one of the different frequency superimposed signals for controlling different desired operations.

References Cited

UNITED STATES PATENTS

| | | | |
|---|---|---|---|
| 2,636,164 | 4/1953 | Lubin et al. | 340—310 X |
| 2,745,991 | 5/1956 | Seymour | 340—310 X |
| 3,280,259 | 10/1966 | Cotter | 340—310 X |
| 2,177,843 | 10/1939 | Seeley. | |
| 1,768,883 | 7/1930 | Braendle | 340—310 |
| 2,378,326 | 6/1945 | Rees et al. | 340—170 |
| 2,479,020 | 8/1949 | Pelmuder | 340—170 |
| 2,684,472 | 7/1954 | Auvil | 340—170 X |
| 3,002,146 | 9/1961 | Lorrig et al. | |

JOHN W. CALDWELL, *Primary Examiner.*

H. I. PITTS, *Assistant Examiner.*

U.S. Cl. X.R.

340—170, 171